Sept. 21, 1965   R. J. HOLTON   3,206,967
METHOD OF MAKING A FASTENER
Original Filed Sept. 8, 1960
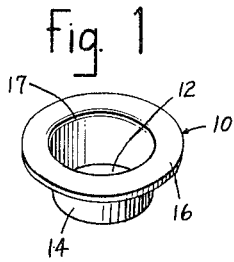
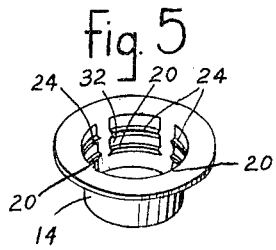
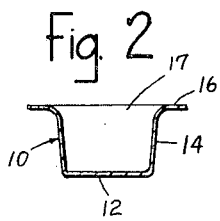
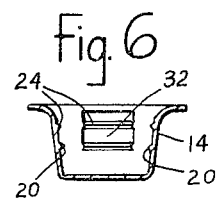
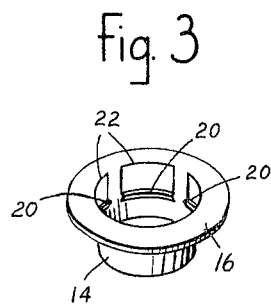
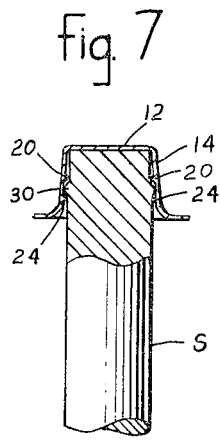
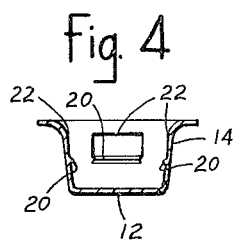
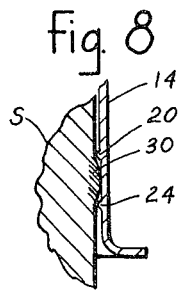
INVENTOR.
ROBERT J. HOLTON
BY
Teare-Teter & Teare
ATTORNEYS United States Patent Office 3,206,967
Patented Sept. 21, 1965

3,206,967
METHOD OF MAKING A FASTENER
Robert J. Holton, Cleveland, Ohio, assignor to Tinnerman Products, Inc., Cleveland, Ohio, a corporation of Ohio
Original application Sept. 8, 1960, Ser. No. 54,679, now Patent No. 3,153,972, dated Oct. 27, 1964. Divided and this application Feb. 20, 1964, Ser. No. 346,262
2 Claims. (Cl. 72—325)

This invention relates in general to fasteners adapted for assembly with an end of a stud, rod, or shaft-like member, and to a novel method of making such fasteners; and more particularly relates to methods for making a cap-like fastener for the indicated purposes. This is a divisional application of the copending United States patent application of Robert J. Holton, Serial No. 54,679, filed September 8, 1960, now Patent No. 3,153,972.

Cap-like fastener devices are useful in a great variety of environmental situations, and may be used, for instance, to give a finished appearance to the end of a stud or shaft, or to retain another object, such as a wheel, in assembled relation with the shaft.

An object of the present invention is to provide a novel method of making a fastener which is readily assemblable in positive secured relation on the end of a stud or rod-like member.

Another object of the invention is to provide a novel method of forming a one-piece, metal, cap fastener device which is adapted for assembly on the end of a stud or shaft-like member, by forcing the cap fastener in an axial direction onto the end of the stud, and which includes means thereon for deforming the shaft in a manner to hold the cap fastener in positive assembled relation with the end of the stud.

A further object of the invention is to provide a novel method of forming a metal cap fastener of the above type produced from a cap blank in the form of a drawn or punched shell, and which embodies at least one pair of axially spaced projections or beads on the interior surface thereof, the innermost of such projections being adapted to shave or score the stud to form an outwardly projecting chip or lug thereon integral with the stud upon assembly of the cap fastener with the stud, and the outermost of said projections being adapted for abutting coaction with the formed chip on the stud, to prevent withdrawal of the cap fastener from assembled relation with the stud.

Another object of the invention is to provide a novel method of forming a cap fastener for assembly with the end of a stud or shaft-like member, and which fastener is of simplified construction, is positive and self-acting in operation, for securing the fastener in assembled relation with the end of the stud, and which is economical to manufacture, and is utilizable with mass production procedures.

Other objects and advantages of the invention will be apparent from the following description taken in conjunction with the accompanying drawings wherein:

FIG. 1 is a generally perspective view of a cap blank in the form of a cap shell utilizable in forming the finalized fastener device;

FIG. 2 is a sectional, elevational view of the cap blank of FIG. 1;

FIG. 3 is a generally perspective view of the cap blank of FIG. 1 after formation of the innermost beads or projections, on the interior thereof, and in accordance with the invention, such projections being the cutting projections of the fastener;

FIG. 4 is a sectional, elevational view of the FIG. 3 arrangement;

FIG. 5 is a generally perspective view of the cap fastener after formation on the interior thereof of the outermost projections or beads, which are adapted to coact in holding relation with the formed chips on the end of an associated stud or shaft, to hold the cap fastener device in positive assembled relation with the stud;

FIG. 6 is a sectional, elevational view of the FIG. 5 arrangement;

FIG. 7 is a partially sectioned, side elevational view of the fastener device as assembled in secured relation on the end of a shaft or stud-like member;

FIG. 8 is an enlarged, fragmentary view taken from FIG. 7 and illustrating in detail the holding coaction between a formed chip on the stud and the fastener.

Referring again to the drawings, in FIG. 1 there is illustrated a blank in the form of a cap shell 10 comprising an end wall 12, and a preferably axial diverging, cylindrical-like side wall or skirt portion 14, with the free ends of said side wall portion curving outwardly to form a brim-like portion 16 of the cap blank. As can be seen, side wall portion 14 defines a stud entry opening 17 in one end of the fastener for receiving the end of a stud in the interior of the fastener. Such a cap blank may be provided from any suitable material, such as for instance, sheet metal, which has been drawn, or otherwise formed into the cap shell illustrtated.

Referring now to FIGS. 3 through 6, the cap blank 10 is provided with preferably a plurality of beads or projections 20 disposed on the interior of wall 14 of the blank, and oriented in spaced circumferential relation with respect to wall 14. The beads 20 are preferably formed by shaving the interior surface of wall 14 downwardly (as viewed in FIGS. 3 and 4), at the locations indicated, commencing at substantially points 22 on the stud entry end of the fastener, and the shaved metal is deformed into the sharpened beads 20 extending interiorly of the cap blank. This shaving and deformation of the metal, provides projections 20 with increased hardness, suitable for scoring or shaving the studs as will be hereinafter described. As can be best seen in FIG. 4, these innermost projections 20 extend interiorly toward the axis of revolution of the cap blank and beyond the defining interior surface of the portion of wall 14 disposed below projections 20.

Referring now to FIGS. 5 and 6, reference numbers 24 identify projections or beads formed above or outwardly of projections 20 on the interior of wall 14, such projections being preferably formed in a similar manner as projections 20, by shaving the interior surface of wall 14 downwardly (as viewed in FIGS. 5 and 6) at the locations indicated commencing substantially at aforementioned points 22 on wall 14. It will be noted that projections 24 do not extend interiorly or radially inwardly of wall 14 as great an extent as do aforementioned projections 20 for a purpose to be hereinafter described. The reason for this is, as can be seen, that the amount of axial shaving movement to form projections 24 is not as great as that utilized to form projections 20. In practice, projections 24 extend inwardly so that the diameter defined by oppositely disposed of such projections 24 is equal to or slightly greater than the shaft or stud diameter on which the cap fastener is adapted for assembly.

Referring now to FIGS. 7 and 8, there is illustrated a shaft or stud S on which has been assembled the finalized fastener device illustrated in FIGS. 5 and 6. Such fastener device is assembled onto the shaft by forcing the cap axially onto the end of the shaft, such as for instance by driving it on by means of a hammer, and during the latter movement, the innermost projections or sharpened beads 20 shave the exterior surface of the shaft, whereby outwardly directed chip or lug portions 30 are formed on the shaft exterior, which chip portions 30 flow outwardly to occupy the space or pockets 32 between projections 20 and 24. As can be best seen from FIG. 8, the formed chips or lugs 30 on the shaft are disposed in generally abutting relation with the corresponding outermost projection or bead 24 on the fastener, in the assembled condition of the fastener on the shaft, thereby positively preventing withdrawal of the cap member from secured relation on the end of the shaft. Thus the mere assembling of the cap fastener with the shaft end automatically secures the cap fastener in positive relation on the end of the shaft member.

The shaving of the interior surface of wall 14 of the fastener blank to form the paired beads or lugs 20, 24, may be accomplished in separate work operations, or may be accomplished substantially simultaneously, with one tool forming the spaced projections at substantially the same time and by means of one stroke into the interior of a blank 10.

From the foregoing discussion and accompanying drawings it will be seen that the invention provides a novel method of forming a fastener adapted for assembly on the end of a stud, shaft, or like member, and which is adapted to score or shave the shaft in a self-acting operation during assembly, to positively secure the fastener to the shaft end.

The terms and expressions which have been used are used as terms of description and not of limitation, and there is no intention in the use of such terms and expressions of excluding any equivalents of any of the features described or shown, or portions thereof, but it is recognized that various modifications are possible within the scope of the invention claimed.

I claim:

1. In a method of forming a fastener for mounting on the end of a shaft or the like, the steps comprising, providing a fastener blank having a generally cylindrical side wall and an end wall defining a cap-like fastener open at one end thereof, shaving the interior surface of the side wall in an axial direction commencing at circumferentially spaced points adjacent the open end and deforming the shaved material inwardly to form a plurality of inwardly projecting beads disposed in generally circumferentially spaced relationship on the side wall, and shaving portions of the first shaved portions of the side wall in an axial direction again commencing at substantially the same locations as the first shaving and deforming the shaved material inwardly to form another plurality of inwardly projecting beads disposed in generally circumferentially spaced relationship and in axially spaced generally aligned relationship with the first mentioned beads.

2. In a method of forming a metallic fastener for mounting on the end of a shaft or the like, the steps comprising, providing a fastener blank having a generally cylindrical side wall and an end wall defining a cap-like fastener open at one end thereof, shaving the interior surface of the side wall in an axial direction commencing at circumferentially spaced points adjacent the open end and deforming the shaved material inwardly to form a plurality of inwardly projecting beads disposed in generally circumferentially spaced relationship on the side wall with said beads being of a relatively increased hardness relative to the material of the side wall, shaving portions of the first shaved portions of the side wall in an axial direction again commencing at substantially the same locations as the first shaving and deforming the shaved material inwardly to form another plurality of inwardly projecting beads disposed in generally circumferentially spaced relationship and in axially spaced generally aligned relationship with said first mentioned beads, and projecting radially so that the diameter defined by oppositely disposed beads is slightly greater than the diameter of the shaft or the like to which the fastener is to be applied.

References Cited by the Examiner

UNITED STATES PATENTS

| 2,013,217 | 9/35 | Olmstead. | |
| 2,461,132 | 2/49 | Urschel et al. | |
| 2,634,495 | 4/53 | Callsen et al. | 29—155.54 |
| 2,880,641 | 4/59 | Sislik | 85—35 |
| 2,963,774 | 12/60 | Pike | 29—155.54 |

WHITMORE A. WILTZ, *Primary Examiner.*

CHARLIE T. MOON, *Examiner.*